Oct. 27, 1959 — F. DANIELS — 2,910,416
NEUTRONIC REACTOR
Filed Nov. 15, 1950 — 2 Sheets-Sheet 1

INVENTOR.
Farrington Daniels
BY
Roland A. Anderson
ATTORNEY

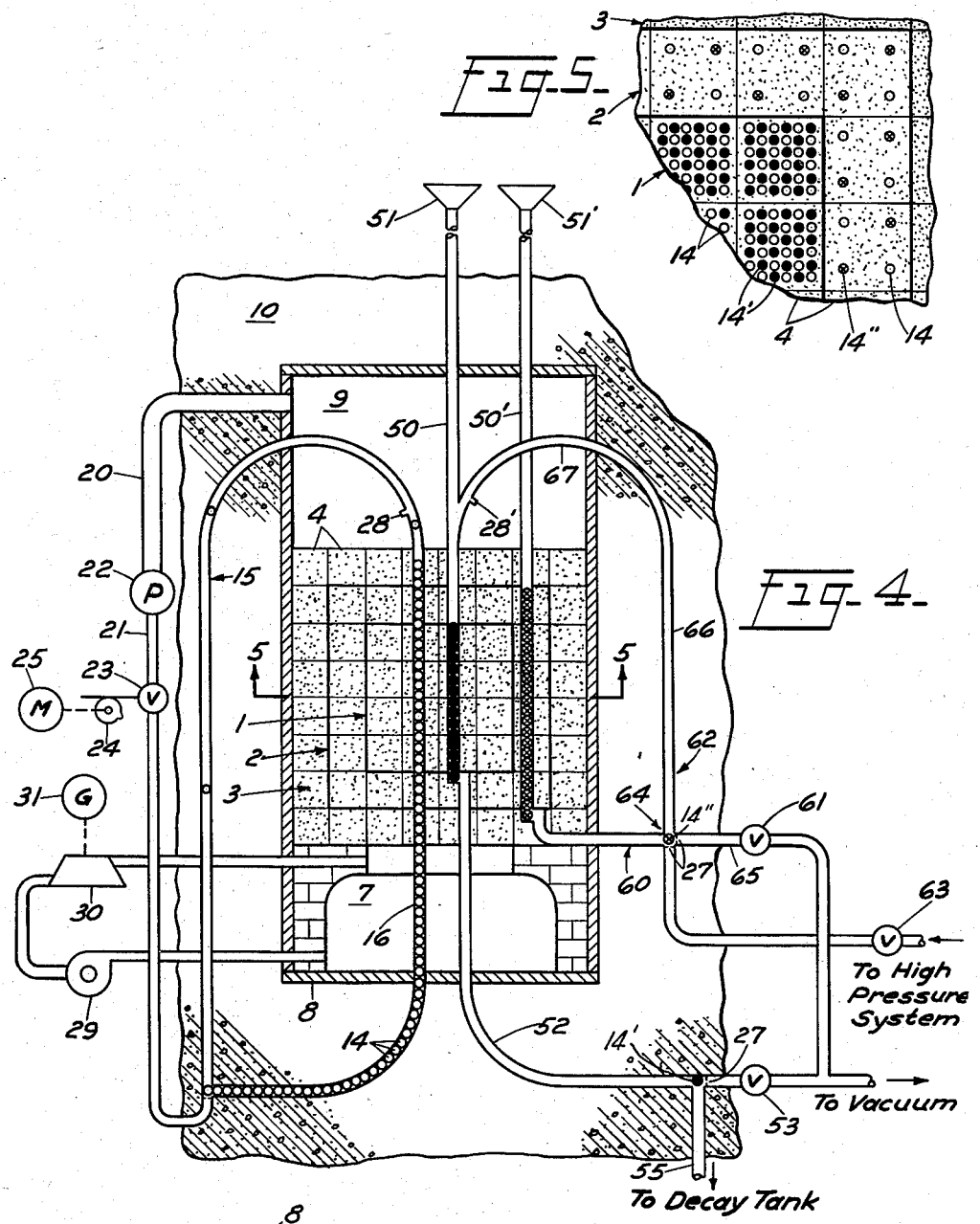

2,910,416

NEUTRONIC REACTOR

Farrington Daniels, Madison, Wis., assignor to the United States of America as represented by the United States Atomic Energy Commission Application November 15, 1950, Serial No. 195,796

8 Claims. (Cl. 204—193.2)

This invention relates generally to the neutronic reactor art, and it is particularly concerned with a novel system for removing the heat of the fission process from a neutronic reactor.

As used in this specification and in the appended claims, the following terminology is defined as indicated below.

Thermal neutrons (slow neutrons)—Neutrons having a substantially Maxwellian number-energy distribution characteristic about an energy value equal to $kt$, where $k$ is a constant and $t$ is the temperature in degrees, Kelvin. ($kt=0.025$ electron volt at 15 degrees centigrade.)

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Fertile—Having the ability to convert to fissionable upon the absorption of a slow neutron.

Slow neutron absorber—An atomic nucleus having a slow neutron absorption cross section greater than 100 barns.

Moderator material—A non-gaseous material for which the ratio $$\frac{\xi \sigma_s}{\sigma_a}$$

is greater than 10, wherein $\xi$ is the average loss in the logarithm of the energy of a fast neutron per elastic collision within the material, $\sigma_s$ is the slow neutron elastic scattering cross section per atom of the material, and $\sigma_a$ is the slow neutron absorption cross section per atom of the material.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a neutronic reactor or "pile." A detailed description of the theory and practice of the design, construction, and operation of reactors generally is set forth in the Science and and Engineering of Nuclear Power, Addison Wesley Press, Inc., Cambridge, Massachusetts, vol. 1 (1947) and vol. 2 (1949). Reference is made particularly to Chapters 4, 5, 6, 8 and 9 of vol. 1 of that publication. Any terminology not specifically defined herein is used in the sense defined on pages 112 to 115 of Goodman, vol. 1.

For whatever purpose a neutronic reactor may be employed, it may be said that the utility of the reactor is, in general, proportional to the maximum power level at which it may be operated. The maximum operating power level, of course, is dependent upon the maximum rate at which heat may be removed from the reactor. Accordingly, it is the primary object of the present invention to provide a novel neutronic reactor and system, which is especially efficient from a heat transfer standpoint, that is, it is especially adapted to a high rate of heat removal therefrom.

For some purposes, such as where the heat removed is intended to be used for heating purposes or for generation of power, the utility of the reactor is also dependent upon the temperature of heat removal, that is, the exit temperature of the cooling medium. It is, therefore, another object of the present invention to provide a neutronic reactor system adapted to heat a cooling medium to a sufficiently high temperature to be useful for heating and/or power generation purposes.

Insofar as applicant is aware, all heretofore proposed reactors intended for the production of useful heat energy have involved the use of a fluid coolant medium, that is, either a liquid or a gas at high pressure. It is readily apparent that the use of a fluid as the coolant medium introduces numerous difficulties in regard to the pumping, circulation, and sealing of the fluid; since the coolant becomes radioactively contaminated during its passage through the reactor, the permissible tolerance for the escape of coolant is extremely low. Accordingly, it is another object of the present invention to provide a novel heat transfer system for a neutronic reactor, which system avoids the necessity of utilizing a fluid as the reactor cooling medium.

The essential novelty of one aspect of the present invention resides in the concept of utilizing a circulating stream of solid balls or pebbles of refractory material, which is preferably also a moderator material, as the primary heat exchange medium, the balls picking up heat as they flow through channels in the reactor, and then relinquishing their heat to a secondary heat exchange medium as they pass through a heat exchanger external to the active portion of the reactor. The refractory balls may be utilized solely as a heat exchange medium, or, as in one form of the invention, they may contain fissionable material and be used to support the chain reaction. In one modification of the invention, a group of balls initially contain fertile material and are disposed in a conversion zone surrounding the active portion; after a sufficient portion of the fertile material has been converted to fissionable material, these balls are transferred to the active portion and thereafter utilized as fuel to sustain the chain reaction. In all forms of the invention, the balls are readily circulated or transferred from one place to another through a conduit system either by gravity or pneumatically.

The use of such refractory balls has important advantages over the use of compressed gas as the coolant in that operation may be carried on at atmospheric pressure, whereas a coolant gas must operate under high pressure in order to remove large quantities of heat. The high pressure needed for a gaseous coolant requires the use of thick walls of steel and thus prohibits the use of very large reactors. Also, the high pressure associated with a gaseous coolant seriously complicates the introduction and removal of fuel and increases the health hazard associated with the possible release of fission products into the surrounding atmosphere. Thus, the use of circulating refractory balls for cooling is cheaper and safer and is applicable to larger reactors. Although liquid metals can be used as the coolant in reactors operating at atmospheric pressure, they cannot be used at very high temperatures because they corrode the metal containers and pipes. The refractory balls, on the other hand, are not subject to this temperature limitation, and they may be used at much higher temperatures, high enough, for example, to operate gas turbines.

Other objects and advantages of the present invention will become apparent from the following specification when taken in connection with the accompanying drawings, wherein Fig. 1 is a sectional elevation view of a neutronic reactor incorporating the principles of the present invention;

Fig. 3 is an enlarged sectional elevation view showing a portion of Fig. 1 in greater detail;

Fig. 4 is a sectional elevation view of a modification of the neutronic reactor shown in Fig. 1; and Fig. 5 is an enlarged partial cross section taken along the lines 5—5 of Fig. 4.

Figures 1, 2:
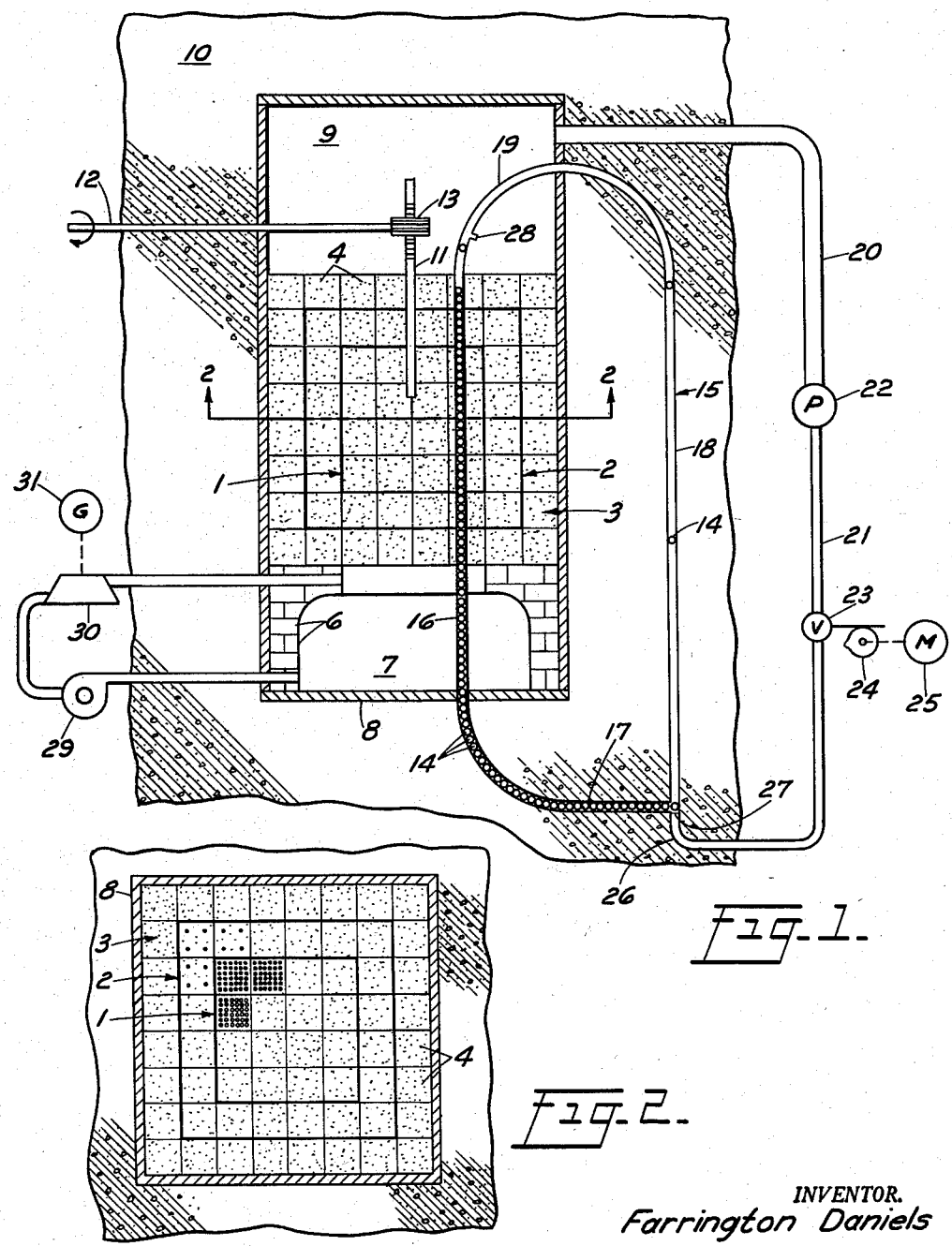
Fig. 2 is a cross section taken along the lines 2—2 of Fig. 1.

Referring now to Figs. 1, 2, and 3, the neutronic reactor comprises a cubical active portion or core 1 wherein the fission chain reaction takes place, a conversion zone 2 surrounding the active portion, and a reflector region 3, in turn, surrounding the conversion zone. The core, conversion zone, and reflector region are most conveniently built up of identically shaped cubes or blocks 4, as shown. This structure is supported at its bottom by a wall of fire bricks 6 which are built into the form of an arch. The wall of fire bricks forms an enclosure 7 which will be referred to as the hot chamber and which functions as a heat exchanger, as will later be described.

The entire thus far described structure is encased by a rectangular iron casing 8, the casing extending upwardly for some distance beyond the top of the reflector region so as to form an upper enclosure 9. The casing 8 is surrounded on all sides by a large mass of concrete 10 which serves both as biological shielding and as the primary supporting structure for the reactor.

The cubes of the active portion 1 are formed of a refractory material containing both fissionable nuclei and moderator nuclei. These cubes may, for example, be formed of uranium carbide, or of a beryllium oxide-uranium dioxide mixture, or of a beryllium carbide-uranium carbide mixture. The latter two mixtures may be readily fabricated by conventional powder metallurgy techniques. Preferably, however, the cubes of the active portion 1 are formed of graphite which has been impregnated with uranium. In whatever form the uranium is present, it must be enriched in the fissionable 235 isotope. The fissionable nuclei are, of course, present in sufficient proportion so that the composition of the active portion has a multiplication factor $(k)$ greater than one and is thus able to sustain a chain reaction of neutron induced fissions.

The functions of the conversion zone 2 are to reflect neutrons which leak out of the active portion 1 back into the active portion, and to utilize non-reflected leakage neutrons for the production of a desired material by nuclear transformation. In order to accomplish the first function, the conversion zone composition must contain moderator nuclei. In addition, in order to accomplish the second function, the composition of the conversion zone either contains a fertile material, such as U-238 or Th-232, so as to produce fissionable material, or it contains a material which, upon the absorption of a neutron, is converted to a useful radioisotope which is desired to be produced in quantity. If it is desired to produce fissionable material, the cubes of the conversion zone 2 are preferably formed of graphite impregnated with Th-232 or with U-238. If the radioisotope C-14 is desired to be produced in quantity, for example, the cubes of the conversion zone 2 may be formed of beryllium nitride, the beryllium atom forming the moderator and the nitrogen atom of mass 14 being converted to C-14 by an (n, p) reaction.

The cubes of the reflector region 3 are formed of a moderator material, such as beryllium oxide, beryllium carbide, or graphite, preferably the latter, which material serves efficiently to reflect leakage neutrons back into the conversion zone 2.

The operating power level of the reactor is controlled in a conventional manner, as by a linearly movable control rod 11 schematically indicated as controllable from a point external to the reactor by means of a rotatable shaft 12 and rack and pinion mechanism 13. The control rod 11 is formed of a material containing a slow neutron absorber, such as boron or cadmium, and it is vertically adjustable within a vertical well formed in the active portion 1.

As best illustrated in Fig. 2, vertical cooling channels are provided extending through the active portion 1 and the conversion zone 2, these channels being formed by vertical holes drilled through the cubes and aligned vertically during the construction of the reactor. Since the active portion 1 releases the major portion of the total reactor heat, more channels are provided through the active portion than through the conversion zone. Thus, as illustrated by way of example in Fig. 2, the active portion may be provided with 36 cooling channels per cube, and the conversion zone with only four cooling channels per cube. The reflector region need not be cooled.

According to the principles of the present invention, heat is extracted from the reactor by the recirculation through the cooling channels of a large number of balls or pebbles 14 formed of a refractory moderator material such as beryllium oxide, beryllium carbide, or graphite, the latter being preferred. The material from which the balls 14 are formed should, of course, have reasonably good heat capacitance and heat conductance characteristics, and graphite is satisfactory in these respects. Associated with each cooling channel, and interconnecting its opposite ends, is an external conduit or raceway indicated generally at 15, as shown in Figs. 1 and 3. Only one of these raceways 15 is shown in Fig. 1 in magnified form for clarity. Each raceway 15 comprises a vertical section 16 which is aligned with, and connects to the bottom of, the associated cooling channel, and which passes downwardly through the hot chamber 7. At least this section 16 of each raceway is formed of a refractory material, such as alumina, porcelain, or graphite. After passing through the hot chamber, and entering the shielding concrete, each raceway curves outwardly into a horizontally extending section 17. The horizontal section 17 intersects a vertical section 18 which passes upwardly through the shielding along the side of the reactor. The vertical section 18 terminates in an inwardly curved looped section 19, the other end of which is aligned with and connects to the upper end of the associated cooling channel.

External to the reactor there is provided a pump 22 having its inlet or low pressure side connected, as by conduit 20, to the upper enclosure 9. Associated with each raceway 15 is a pipe 21 which is connected at one end to the outlet or high pressure side of the pump 22, and which terminates at its opposite end in an upwardly extending vertical section 26 which communicates with the bottom of the vertical section 18 of the raceway 15. Interposed in the pipe 21 is a quick acting normally closed valve 23 which is schematically indicated as being periodically momentarily opened by a cam 24 driven by motor 25.

A gas permeable grid 27 is disposed at the top of the vertical section 26 of the pipe 21 at the point of intersection with the horizontal section 17 of the raceway 15 in order to prevent the balls 14 from dropping downwardly into the pipe 21. A sufficient number of balls 14 are associated with each cooling channel to form a column of balls extending from the grid 27 back through the hot chamber 7 to a point near the top of the reactor.

In the operation of the pneumatic ball recirculation system, a high pressure pulse or puff of compressed gas, preferably an inert gas, such as helium or nitrogen, is released each time the valve 23 is momentarily opened. The puff of gas blows the one ball which is resting on the grid 27 upwardly around the raceway 15 and back into the top of the associated cooling channel, the column of balls thus being permitted to drop by gravity a distance equal to one ball diameter so that another ball assumes a momentary position of rest on the grid 27. This ball in turn is blown around the raceway 15 by the next puff of gas, and so on. A vent 28 is provided in the looped section 19 of each raceway 15 to release the puff of gas into the upper enclosure 9.

As previously indicated the gas chamber 7 and the vertical sections 16 of the raceways 15 form a heat exchanger in which the reactor heat is extracted from the balls 14. This heat is picked up by a secondary heat exchange medium which is circulated through the hot chamber 7 and around the portions of the vertical sections 16 of the raceways which extend through the chamber 7. The secondary heat exchange medium could be any fluid and the heat derived could be utilized for any purpose such as industrial heating or processing. For purposes of illustration, however, a closed gas turbine power system is shown wherein a pump 29 forces a gas, such as carbon dioxide or helium, through the hot chamber 7, through a gas turbine 30 and back to the inlet side of the pump. The gas turbine is schematically indicated as being connected to operate an electrical generator 31 for the production of useful electrical energy.

A distinct advantage of the above described reactor lies in the fact that the speed of motors 25 may be easily adjusted so as to conform the ball circulation rate to the operating load. It will also be appreciated that in the above described reactor, the rate at which the balls progress through any particular channel may be individually adjusted externally to the reactor by a simple adjustment of the speed of the particular motor 25 associated with that channel. This constitutes an important advantage, since, in general, the distribution of heat production across a neutronic reactor is uneven, the greatest amount of heat being produced near the center. Thus, the rate of ball movement through the channels may be adjusted in accordance with the average heat produced in the immediate neighborhood of the respective channels, whereby the maximum operating temperature of all of the balls may be maintained substantially equal to the maximum permissible value. This desirable result may be closely approximated, if desired, with considerable reduction in the number of valves 23 and motors 25 by permitting each motor 25, valve 23, and pipe 21 to supply puffs of compressed gas to an entire set of raceways 15, which set communicates with a set of cooling channels having a common average rate of heat production, that is, having substantially equal displacements from the reactor axis. In the latter case, the balls in each set of channels and associated raceways would be operating in unison in response to the single valve 23 associated with that set.

By way of example, some of the more important construction details and operating characteristics of one reactor design embodying the principles of the present invention will be briefly given. The active portion is a cube four feet on edge and consists of sixty-four cubes each one foot an edge. The cubes forming the active portion are fabricated of graphite impregnated with approximately one percent by weight of U–235, a total of about twenty kilograms of U–235 being present in the active portion. Each cube of the active portion contains thirty-six cooling channels, each one inch in diameter. The graphite balls 14 are slightly less than one inch in diameter and progress through the active portion at an average linear velocity of about seven inches/sec. The graphite balls enter the reactor at about 500° F. and emerge at about 1400° F., giving a total temperature rise of about 900° F. The reactor proper operates at a power level of about 20,000 kilowatts.

In the reactor shown in Figs. 1, 2, and 3, the fissionable material is present in the permanent structure of the reactor, that is, in the cubes 4 of the active portion 1. When the fissionable material has been depleted to the extent that the reactor is no longer self-sustaining, the blocks must be removed for reprocessing and replaced with new blocks, that is, the reactor must be torn down and rebuilt. In the modification of the invention which is shown in Figs. 4 and 5, provision is made for refueling the reactor during operation.

The reactor of Figs. 4 and 5 differs from that of Figs. 1, 2, and 3 in that only half of the vertical channels through the active portion 1 and through the conversion zone 2 are devoted strictly to cooling purposes. These channels, which will hereinafter be referred to as cooling channels, contain balls 14 formed of refractory moderator material, which balls are recirculated in the same manner and by the same apparatus as was described with respect to Figs. 1, 2, and 3. The remaining half of the channels through the active portion will be referred to as fuel channels since they contain a plurality of fuel balls or pebbles 14' formed of a refractory material containing fissionable nuclei. These balls 14' may, for example, be fabricated of graphite impregnated with U–233 or U–235. It will be noted that the cooling channels and the fuel channels are arranged alternately in the active portion.

A vertical tube 50 extends upwardly from the top of each fuel channel and it terminates in a hopper 51 disposed externally to the reactor shielding. Fuel balls 14' may thus be loaded into the hoppers 51 and permitted to fall by gravity through tubes 50 into the associated fuel channels. As shown in Fig. 4, each fuel channel has an upper and a lower vertically directed section, these two sections being slightly offset from one another in a lateral direction and interconnected by a small laterally extending section disposed at the bottom of the active portion. This jog or discontinuity in the fuel channel provides a seat for the column of fuel balls 14' which stack up above the seat, the bottom fuel ball being more or less loosely retained by friction and the weight of the balls above it.

A pneumatic tube 52 connects to the bottom of each fuel channel, passes downwardly through the hot chamber 7, and then curves outwardly into a laterally extending section which is connected to the vacuum side of a pneumatic system. A normally closed manually operable valve 53 is interposed in tube 52. Also interposed in tube 52 is a gas permeable grid 27. A discharge tube 55 intersects tube 52 at a point immediately to the reactor side of the grid 27.

In the operation of the reactor of Figs. 4 and 5, as thus far described, sufficient fuel balls 14' are charged into the fuel channels by way of hoppers 51 and pipes 50 to form columns of fuel balls extending the length of the active portion 1. When it is desired to discharge one of the fuel balls 14' from a particular fuel channel, the valve 53 associated with that channel is momentarily opened, thus producing a momentary low pressure surge in tube 52 of sufficient strength to dislodge the bottom ball of the column by suction. The released ball then rolls down tube 52 until stopped by the grid 27, at which point it falls to a suitable decay tank by way of discharge tube 55. It will thus be apparent that spent fuel balls 14' may be readily discharged from the reactor and new fuel balls inserted according to any desired time schedule.

In the form of the invention which is shown in Figs. 4 and 5, all of the fissionable material included in the active portion 1 is preferably contained in the fuel balls 14'. That is, the cubes 4 of the active portion 1 are free of fissionable material and are formed simply of a refractory moderator material, such as graphite. If desired, however, a portion only of the fissionable material required to sustain the chain reaction may be contained in the fuel balls 14' and the remainder included in the cubes 4 of the active portion.

Arranged alternately with the cooling channels which pass through the conversion zone are an equal number of channels which contain a plurality of conversion balls or pebbles 14" formed of a refractory material containing fertile nuclei. These channels will hereinafter be referred to as conversion channels. The balls 14" may, for example, be fabricated of graphite impregnated with Th-292 or U-238.

The conversion channels each have a main upper section and small lower section, which sections are offset somewhat from one another in a lateral direction and are interconnected by a small laterally extending section disposed at the bottom of the conversion zone 2. This jog or discontinuity in the conversion channel provides a seat for the column of conversion balls 14" which are stacked up above the seat, the bottom conversion ball being more or less loosely retained by friction and the weight of the balls above it. A vertical tube 50' extends upwardly from the top of each conversion channel and terminates in a hopper 51' disposed externally to the reactor shielding. Conversion balls 14" may thus be loaded into the hopper 51' and permitted to fall by gravity through tube 50' into the associated conversion channel. Sufficient conversion balls 14" are loaded into each conversion channel to form a vertical column extending the entire length of the conversion zone 2.

A pneumatic tube 60 connects to the bottom of each conversion channel. Tube 60 curves outwardly into a laterally extending section 65 and thereafter is connected through a normally closed valve 61 to the vacuum side of the pneumatic system. Another tube 62 is associated with each conversion channel and this tube is connected at one end through a normally closed valve 63 to the high pressure side of the pneumatic system. Tube 62 has a vertical section 66 which intersects the laterally extending section 65 of tube 60 at right angles, as at 64. The vertical section 66 of tube 62 terminates at its top in a looped section 67 which enters the upper enclosure 9 and then makes a tangential connection with one of the tubes 50 which connect to the fuel channels. It will be appreciated that since there are a greater number of fuel channels than conversion channels, only a portion of the tubes 50 will have tubes 62 connected thereto in this manner. Interposed in the laterally extending section 65 of tube 60, immediately adjacent the point of intersection 64, is a gas permeable grid 27, and an identical grid 27 is interposed in the vertical section 66 of tube 62 immediately below the intersection 64.

In operation, the conversion balls 14" are permitted to remain in their conversion zones until such time as a sufficient portion of the contained fertile material has been converted to fissionable material to permit these balls to be used as fuel balls. The valve 61 is then momentarily opened, the resulting vacuum dislodging the lower conversion ball 14" of the associated column of conversion balls. The thus released ball rolls as far as the intersection 64 and comes to rest against the grids 27 in an aligned relationship with the vertical section 66 of tube 62, as shown in Fig. 4. The valve 61 having closed, the valve 63 is then momentarily opened, and the resulting puff of compressed gas blows the ball upwardly along tube 62, around the looped section 67, and into the associated fuel channel by way of tube 50. A vent 28' is provided in the looped section 67 of tube 62 in order to release the gas blast into the upper enclosure 9. The ball thereafter operates as a fuel ball 14' and its further progress is as described previously. Thus, there is provided a simple remotely controlled means for transferring fertile material from the conversion zone 2 into the active portion 1 after a sufficient percentage of the fertile material has been converted to fissionable material.

In the form of the invention shown in Figs. 4 and 5, all of the fertile material included in the conversion zone 2 may be contained in the conversion balls 14", in which case the cubes 4 of the conversion zone are formed simply of a refractory moderator material, such as graphite, or, if desired, a portion only of the fertile material may be contained in the conversion balls 14" and the remainder included in the cubes 4 of the conversion zone 2.

As previously brought out, applicant's invention is not concerned with the nuclear physics aspects, as such, of neutronic reactors, but rather is directed to improvements in methods and apparatus for removing heat from the reactor and for effecting the circulation and movement from one place to another of the cooling medium and the fissionable material. It will be apparent therefore that the invention is in no way dependent upon the many reactor physics parameter which can be varied within wide limits by the designer to suit his desires. Such parameters include the ratio of fissionable material to non-fissionable material, the moderating, absorbing and scattering properties of the particular materials employed, and so forth. As is well known the actual size of the reactor may be adjusted over an extremely wide range by a suitable choice of these nuclear parameters in accordance with the principles of reactor physics set forth in the previously referred to Goodman publication. It will be appreciated therefore that the principles of the present invention can be applied equally well to very large reactors or to very small reactors.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. In a neutronic reactor having an active region comprising a solid moderator, a solid fissionable fuel, and a plurality of channels extending therethrough, the improvement comprising a portion of at least said moderator being disposed in the form of a plurality of balls in at least a portion of said channels, and a pneumatic system, including an intermittently-operated, quick-acting valve, to withdraw said balls one at a time from said active portion.

2. In a neutronic reactor having an active region comprising a solid moderator, a solid fissionable fuel, and a plurality of channels extending vertically therethrough, the improvement comprising a portion of said moderator being disposed in the form of a plurality of balls in a plurality of selected channels; an external circulatory conduit associated with each of said selected channels and interconnecting opposite ends of the associated channel; a pneumatic system including an intermittently-operated, quick-acting valve, for forcing periodic puffs of gas along said conduits to thereby withdraw and transfer said balls one at a time from the bottom to the top of said conduits; and heat exchange means associated with said external circulatory conduits for extracting heat from said balls.

3. In a neutronic reactor having an active region comprising a solid moderator, a solid fissionable fuel, and a plurality of channels extending therethrough, the improvement comprising a portion of said moderator being disposed in the form of balls in at least a portion of said channels, said balls additionally containing at least a portion of said fuel; and pneumatic means, including an intermittently-operated, quick-acting valve, for withdrawing said balls one at a time from said active portion.

4. In a neutronic reactor having an active region comprising a solid moderator, a solid fissionable fuel, and a plurality of channels extending vertically therethrough, the improvement comprising a plurality of tubes connecting to a plurality of selected channels at the bottom of said active portion, each of said tubes having a vertical section laterally offset from its associated channel and a laterally extending section interconnecting the vertical section and the associated channel; a portion of said moderator being disposed in the form of balls in said selected channels forming columns of balls terminating at, and supported by, the laterally extending sections of the associated tubes; said balls additionally containing at least a portion of said fuel; and pneumatic means, including an intermittently-operated, quick-acting valve, for withdrawing said balls one at a time from said active portion.

5. In a neutronic reactor having an active region comprising a solid moderator, a solid fissionable fuel, and a plurality of channels extending vertically therethrough, the improvement comprising a portion of said moderator being disposed in a first group of said channels in the form of a plurality of balls; at least a portion of at least said fuel being disposed in the form of balls in a second group of said channels; pneumatic means, including an intermittently-operated, quick-acting valve, to withdraw one at a time, from the bottom of said first group of channels, and to transfer, externally of said active portion, each ball to the top of the channel from which it was withdrawn; means to extract heat from said balls of said first group of channels while said balls are external of said active portion; and means to withdraw said balls one at a time from the bottom of said second group of channels.

6. In a neutron reactor having an active region comprising a solid moderator, a solid fissionable fuel, and first and second groups of channels extending vertically therethrough, and a conversion zone disposed about said active portion comprising a solid moderator, a solid fertile material, and a third group of channels extending vertically therethrough, the improvement comprising a portion of said moderator being disposed in the channels of said first group in the form of balls; at least a portion of at least said fuel being disposed in the channels of said second group in the form of balls; at least a portion of at least said fertile material being disposed in the channels of said third group in the form of balls; pneumatic means including an intermittenly-operated, quick-acting valve to withdraw said balls one at a time from the bottom of first group of said channels, and to transfer externally of said active portion each ball withdrawn from said first group of channels to the top of the channel from which it was withdrawn; means to extract heat from said balls of said first group of channels while said balls are external of said active portion, means to withdraw, one at a time, said balls in said second group of channels, and means to withdraw, one at a time, said balls in said third group of channels.

7. A reactor as claimed in claim 6 being additionally provided with a pneumatic transfer system to transfer balls withdrawn from the bottom of each channel of said third group to the top of an associated channel in said second group.

8. In a neutronic reactor having an active region comprising a solid moderator, a solid fissionable fuel, and a first group of channels extending therethrough, and a conversion zone surrounding said active portion comprising a solid moderator, a solid fertile material, and a second group of channels passing therethrough, the improvement comprising at least a portion of at least said fuel being disposed in said first group of channels, at least a portion of at least said fertile material being disposed in said second group of channels, and remotely controllable means for transferring at least a portion of the fertile material from said second group of channels to said first group of channels.

References Cited in the file of this patent

UNITED STATES PATENTS 2,577,655     Grossman et al.           Dec. 4, 1951

FOREIGN PATENTS 114,150     Australia               May 2, 1940
861,390     France                 Oct. 28, 1940
233,011     Switzerland            Oct. 2, 1944

OTHER REFERENCES

Smyth: "Atomic Energy for Military Purposes," pp. 22, 177, August 1945. Copy may be purchased from Supt. of Documents, Washington 25, D.C.

Norton: "Chemical and Metallurgical Engineering," July 1946, pp. 116–119.

Harwell: "The British Atomic Energy Research Establishment," 1946–1951, London, 1952, pp. 39–42.

"The Science and Engineering of Nuclear Power," by Clark Goodman, vol. I, Addison Wesley Press, Cambridge, Mass., 1947, pp. 298, 302, 303, 304, 308, 319, 320, 327, 328.

Kelley et al.: "Physical Review," 73, 1135–9 (1948).

A Forum Report, Nuclear Reactor Development, Atomic Industrial Forum, 260 Madison Ave., New York 16, N.Y., publ. July 1954, page 18.